United States Patent [19]

Corse

[11] 4,113,225
[45] Sep. 12, 1978

[54] OPEN END BAKING PAN

[76] Inventor: Kenneth J. Corse, P.O. Box #181, Conklin, N.Y. 13748

[21] Appl. No.: 805,275

[22] Filed: Jun. 10, 1977

[51] Int. Cl.² .............................................. B41B 11/58
[52] U.S. Cl. ...................... 249/169; 99/426; 220/307; 249/168; 249/DIG. 1
[58] Field of Search .................. 99/426, 430; 220/306, 220/307; 249/102, 163, 160, 168, 169, 170, DIG. 1

[56] References Cited

U.S. PATENT DOCUMENTS

| 493,835 | 3/1893 | Peacock | 249/169 |
|---|---|---|---|
| 701,198 | 5/1902 | Grant | 249/169 |
| 1,223,226 | 4/1917 | Wells | 249/169 |
| 1,497,033 | 6/1924 | Sinclair | 249/168 |
| 1,714,379 | 5/1929 | Kratz | 249/169 |
| 1,938,590 | 12/1933 | Hoffman | 220/307 |
| 2,939,101 | 5/1960 | Johnson | 220/307 X |
| 3,326,408 | 6/1967 | Ringlen | 220/307 |

*Primary Examiner*—Stanley N. Gilreath
*Attorney, Agent, or Firm*—George E. Clark

[57] ABSTRACT

A baking pan has a removable end portion which allows easy access to the baked goods after baking. The removable end portion may be used as a spatula to lift the baked goods from the baking pan with minimum damage of the baked goods due to sticking.

3 Claims, 3 Drawing Figures

OPEN END BAKING PAN

BACKGROUND OF THE INVENTION

The present invention relates to utensils, and more particularly to improved baking utensils.

In the prior art, there are many utensils designed for use in preparation of baked goods. Most of the prior art baking utensils make it extremely difficult to remove a pie or cake from the pan without tearing up the baked goods and generally destroying the effort that the cook has spent a good deal of time in preparing.

There have been several approaches to solve the problem of baked goods sticking to the bottom of the baking utensils. One example of such a prior art device is a round baking utensil having a relatively flat member pivotally mounted at the center of the baking pan on the inner surface extending radially outward to the edge of the baking pan and then having a member extending upward so that after a round pie or cake has been baked, this pivotally mounted member may be rotated around the edge of the baking pan to separate the baked goods from the pan. A major disadvantage of this type of prior art baking utensil is that the concept may be used effectively only with round baking pans.

Other prior art attempts at solving the sticking problem have resulted in single use baking utensils where a portion of the periphery of the baking utensil was broken or bent away to allow access to the baked goods contained within the utensil. An example of this type of prior art device is U.S. Pat. No. 3,580,484. The most obvious disadvantage of such device is that it is expensive being a single use device which must be disgarded after one use.

SUMMARY OF THE INVENTION

Therefore, it is a primary object of the present invention to provide a baking utensil which is inexpensive and yet allows access to the bottom of the baked good product so that the baked good product may be separated from the utensil for ease in removing the baked good product from the utensil.

It is a further object of the present invention to provide a baking utensil having a side member which is removable thus allowing access to the sides and bottom of a baked good product which removable member may be used as a spatula to separate the baked good product from the baking utensil.

Accordingly, a baking utensil is formed with a number of side members and a bottom, one of said side members being removable and being formed such that it may be used as a spatula to separate the baked good product from the bottom of the baking utensil.

It is an advantage of the present invention that a baking utensil constructed according to the present invention may be inexpensively constructed and reusable and may be formed in a variety of shapes and configurations.

Other objects, features, and advantages of the present invention will be more fully understood from the following detailed description of a preferred embodiment with reference to the following drawing.

DETAILED DESCRIPTION OF A PREFERRED EMBODIMENT OF THE INVENTION

Figure 1:
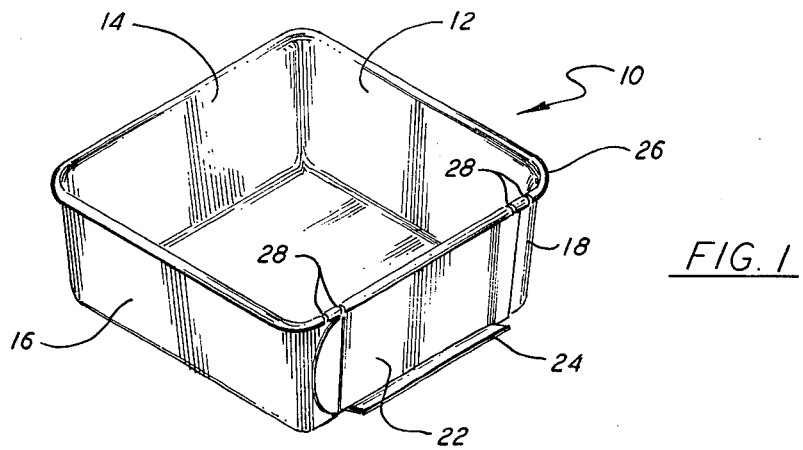
FIG. 1 is an isometric view of a baking utensil according to the present invention with a removable side member in place.

Referring now to FIG. 1, a baking utensil according to the present invention will be described with reference to a rectangular shaped embodiment. Baking utensil 10 has four sides 12, 14, 16 and 18. Side 18 has an opening 20, therein, which is covered in FIG. 1 by removable side member 22. At the bottom of side 18 there is a lip 24 (the length of the opening) which greatly aids in the easy removal of the baked product from the pan. The bottom edge of the removable side member 22 rests upon the lip 24. The top straight edges to either side of the top curled edge snap underneath the short curled sections between slots 28.

Figure 2:
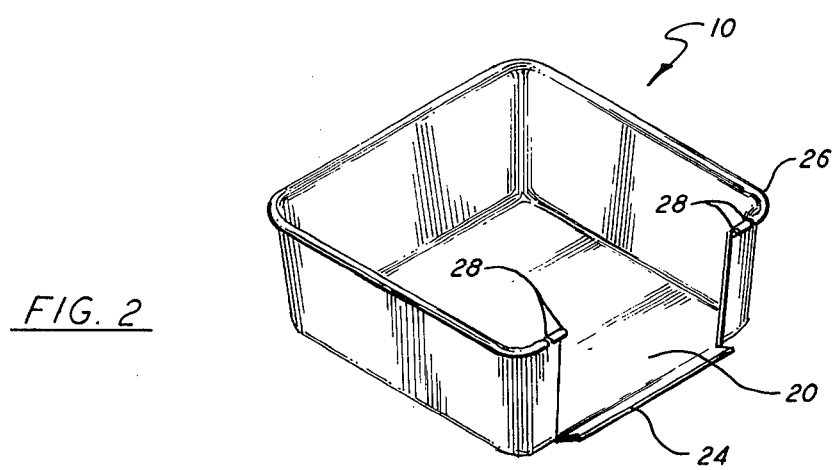
FIG. 2 is an isometric view of a baking utensil according to the present invention where a removable side member has been removed for access to the baked good product.

Referring now to FIG. 2, it can be seen that with removable side member 22 removed from baking utensil 10, access to the baked good product is relatively easy and the baked good product may be removed from the baking utensil without damaging or tearing the baked good product.

Also, with respect to FIG. 2, curled edge 26 of baking utensil 10 runs around the complete perimeter of the baking utensil. At two positions on either side of the opening in side 18, slots 28 are cut in the curled edge 26. These short sections between slots 28 act as a spring, thus more assuredly locking the removable member 22 between the curled edges and the bottom lip 24.

Figure 3:
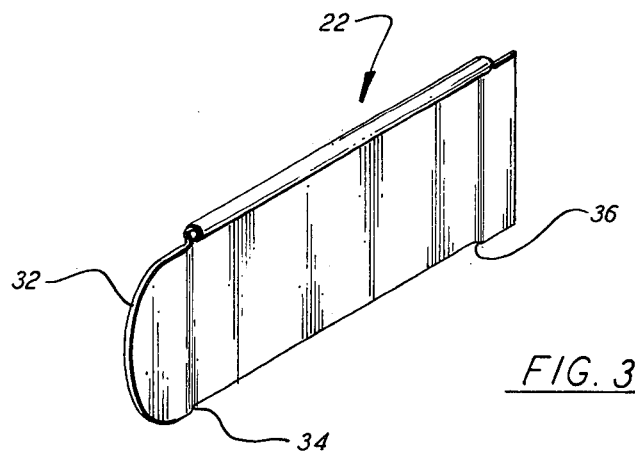
FIG. 3 is an isometric view of a removable side member for the baking utensil according to the present invention.

Referring now to FIG. 3, side member 22 is shown in greater detail, more specifically indicating the shape having a rounded portion 32 at one end thereof to be used as a spatula for removing the baked good product and having bends 34 and 36 to provide a tight seal of the opening in side 18 to prevent seepage of the dough before or during baking.

Although the invention has been described with reference to a rectangular baking pan, it is readily seen that any shape having at least one side may be used with the present invention.

Although the invention has been described with reference to a preferred embodiment thereof, it will be apparent to those skilled in the art that various changes in detail and scope may be made without departing from the spirit of the invention.

What is claimed is:

1. A baking utensil comprising:
   three or more side portions and a bottom portion, one of said side portions having a removable member;
   said removable member having one end thereof formed in a semi-circular pattern to enable said removable member to be used as a spatula to aid in removal of baked good product from said baking utensil;
   a lip along a bottom of an opening of said side portion having a removable member to provide a leakproof seal when said removable member is in place;
   a curled lip around a top of said three or more side portions, said curled lip having one or more cuts therein to form sections of said curled lip which act as spring members to hold said removable member tightly in place.

2. A baking utensil according to claim 1 wherein said removable member has first and second bends therein forming an indented portion of said removable member which indented portion approximately coincides with the inner surface of said side portions of said baking utensil.

3. A baking utensil according to claim 2 wherein said removable member further comprises a curled edge along one side of said removable member which matches said curled edge of said baking utensil when said removable member is in place.

* * * * *